(12) United States Patent
Novak et al.

(10) Patent No.: US 6,718,348 B1
(45) Date of Patent: Apr. 6, 2004

(54) NON-TIME DEPENDENT SYNCHRONIZATION OF DATABASES

(75) Inventors: Lars Novak, Lund (SE); Jörgen Birkler, Malmö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 471 days.

(21) Appl. No.: 09/645,305

(22) Filed: Aug. 25, 2000

(51) Int. Cl.[7] .................... G06F 12/00; G06F 17/30
(52) U.S. Cl. .................. 707/201; 707/202; 707/204
(58) Field of Search ................ 707/200–201, 707/204

(56) References Cited

U.S. PATENT DOCUMENTS

| | | | |
|---|---|---|---|
| 5,742,820 A | * 4/1998 | Perlman et al. | 707/201 |
| 5,924,094 A | * 7/1999 | Sutter | 707/10 |
| 5,991,771 A | * 11/1999 | Falls et al. | 707/202 |
| 6,078,930 A | * 6/2000 | Lee et al. | 707/202 |
| 6,243,702 B1 | * 6/2001 | Bamford et al. | 707/8 |
| 6,247,135 B1 | * 6/2001 | Feague | 713/400 |
| 6,295,541 B1 | * 9/2001 | Bodnar et al. | 707/203 |
| 6,393,419 B1 | * 5/2002 | Novak et al. | 707/8 |
| 6,438,563 B1 | * 8/2002 | Kawagoe | 707/201 |
| 6,449,622 B1 | * 9/2002 | LaRue et al. | 707/201 |
| 6,466,951 B1 | * 10/2002 | Birkler et al. | 707/201 |
| 6,560,700 B1 | * 5/2003 | Birkler et al. | 713/1 |

OTHER PUBLICATIONS

S. Balasubramaniam and Benjamin C. Pierce. "What is a File Synchronizer?". MOBICOM 98. ACM. 1998. Pp. 98–108.*

Jim Gray, Pat Helland, Patrick O'Neil, and Dennis Shasha. "The Dangers of Replication and a Solution". 1996. SIGMOD. ACM. Pp. 173.*

I. Stanoi D. Agrawal, A. El Abbadi, S.H. Phatak, and B.R. Badrinath. "Data Warehousing Alternatives for Mobile Environments". ACM. May 1998. Pp. 110–115.*

* cited by examiner

Primary Examiner—John Breene
Assistant Examiner—Steve Schrantz
(74) Attorney, Agent, or Firm—Burns, Doane, Swecker & Mathis, L.L.P.

(57) ABSTRACT

A first database is synchronized with a second database, wherein the first database is located in a mobile terminal. To avoid erroneous synchronization results that can occur if a timer associated with the mobile terminal is changed, relative to a timer associated with the second database, an indicator is set to indicate that a full synchronization should be performed whenever it is detected that the timer in the mobile terminal has been set back. Then, when synchronization is to take place, full synchronization of the first database with the second database is performed if the indicator is set. Otherwise, a fast synchronization that uses a change log may be performed. The indicator may be in the form of a change in a database identifier.

24 Claims, 5 Drawing Sheets

NON-TIME DEPENDENT SYNCHRONIZATION OF DATABASES

BACKGROUND

The present invention relates generally to communications systems and, in particular, to techniques that provide for synchronizing databases, such as a database containing a phonebook stored in a subscriber identity module (SIM) of a mobile terminal used in a cellular radiocommunication system with a corresponding database in a personal computer (PC).

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as to maintain high quality service and avoid rising prices.

One recognized trend is the convergence of the so-called information industry, as symbolized by the evolution of the personal computer (PC), and the so-called communications industry, as symbolized by the evolution of the mobile phone. Both types of devices are characterized by rapidly increasing performance (hardware) and by increased application (software) capabilities. In the near future, it is likely that mobile phones will communicate more directly with other information devices, such as the PC, to exchange information. Many subscribers of wireless services also own personal computers and, as each type of device gets more sophisticated in its data handling capability, may wish to exchange data therebetween, for example, between databases (such as phone books), stored in each device.

Figure 1:
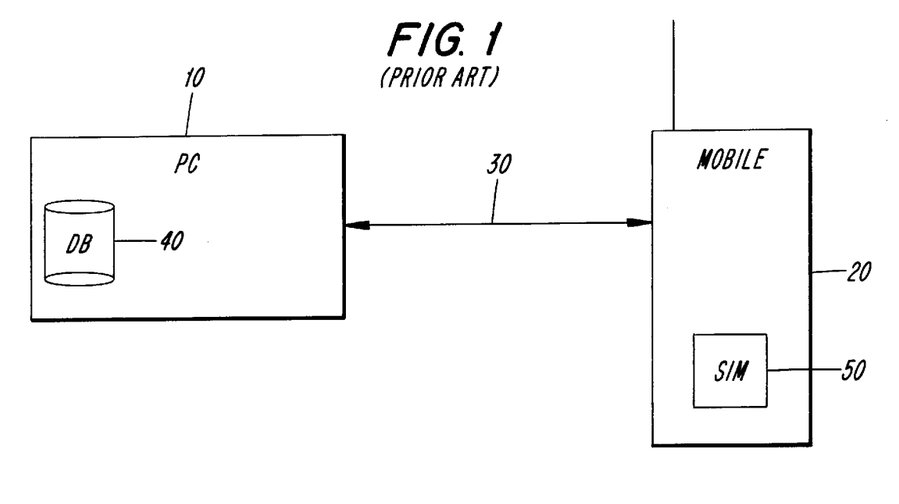
FIG. 1 is a block diagram that illustrates a conventional technique for synchronizing databases between devices.

Consider the example illustrated in FIG. 1. Therein, a PC 10 and a mobile phone 20 are linked together via a communication link 30. The communication link 30 may be either a wire or wireless (e.g., infrared) link. It will be appreciated by those skilled in the art that, while a PC and mobile phone are used as examples of two devices between which database synchronization may be performed, the present invention is not limited to these two types of devices and may, in fact be applied to database synchronization between any two types of devices, such as electronic organizers, pagers, and the like. The PC 10 includes a database 40, for example, containing phone records or a calendar, while the mobile phone 20 includes a corresponding database stored on its subscriber identity module (SIM) card 50. As will be appreciated by those skilled in the radiocommunication arts, the SIM card 50 is a removable smart card that was created for the GSM radiocommunication standard as a mechanism for conveniently grouping and storing information elements related to the mobile subscriber in a removable manner, which card is insertably removable from mobile phones. The term "synchronize", as it is used herein to refer to database operations associated with two or more devices, means changing the contents of one database so that it matches, or "mirrors", the contents of the other database.

Conventionally, to synchronize the database 40 and the database stored on the SIM card 50, it was necessary to individually compare each record in each database. For example, the database of phonebook records stored in the SIM card 50 could be transmitted to the PC 10 via link 30. Then, the records in each database could be compared and updated such that the two databases mirrored one another. For example, changes associated with records found in the database 40 but not found in the version of the database transmitted from the mobile phone 20 to the PC 10 could be relayed back to the mobile phone 20 to update the database stored in the SIM card 50. This synchronization process (sometimes alternatively referred to as "full synchronization" or "slow synchronization") is complicated and time consuming. For example, just to identify what changes had been made to the SIM card's database often requires that the PC 10 compare a most-recently received version with a previously stored version.

Figure 2:
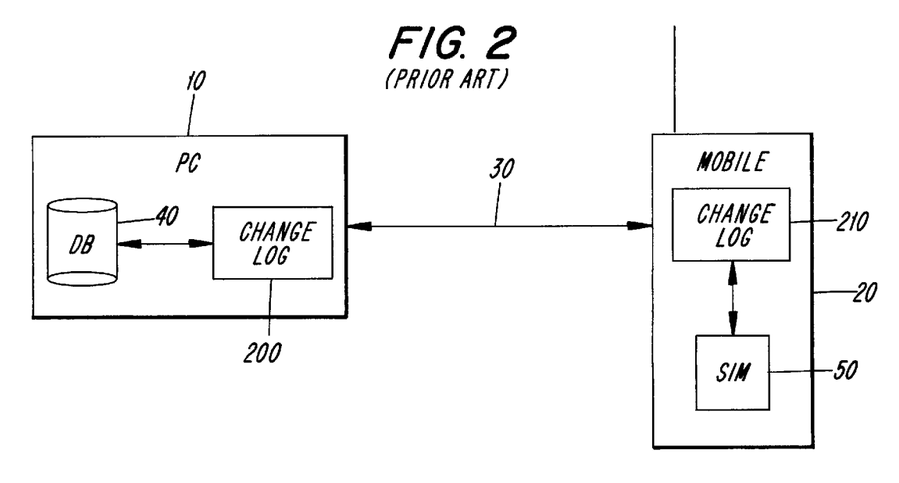
FIG. 2 is a block diagram that illustrates a modification of the technique and system of FIG. 1, wherein change logs are introduced into each device for synchronizing the database.

To address this problem, a change log has been added to the devices as shown in FIG. 2. The change log contains information regarding records which have been operated upon in either database subsequent to synchronization therebetween. The change log also records the time at which a synchronization operation was last performed between two databases, so that changes made prior to a previous update can be ignored. The change log can be implemented, for example, in a portion of memory which records for each change an event (e.g., add, delete or modify), the identity of the database record for which the event occurred and a timestamp indicating when the event took place. For example, if a phone record is added to the database 40 in PC 10 subsequent to it being synchronized with the SIM 50 in mobile phone 20, then an indication of such is added to the change log 200. Likewise, if the subscriber associated with the mobile phone 20 (and SIM card 50) deletes a record in his or her phonebook, then this change will be reflected in the change log 210. Moreover, if the change log is empty, then no changes need to be made to the database 40 in the PC 10. Using change logs 200 and 210 may be advantageous during synchronization since only those records which have been modified, added or deleted (as recorded in the change log) since the last synchronization update need to be transmitted between the devices. Thus, the synchronization process may be performed more rapidly and this process has, therefore, been referred to as "fast synchronization".

Under certain circumstances, however, it may still be desirable to perform full (i.e., slow) synchronization of corresponding databases in two devices even when change logs have been implemented to enable fast synchronization. For example, if a user resets or erases his or her calendar database in a mobile phone, such an action may dictate that a full synchronization be performed between the two databases, that is, the large number of changes results in there being no particular advantage in such cases to using the change logs 200 and 210 to accomplish synchronization. Invoking full synchronization of two databases when fast synchronization is available has been accomplished by, for example, randomly or incrementally changing the value of a database identifier (DID) which is passed between the devices as part of the synchronization process. The change in DID values acts as a signal that tells the device performing database synchronization to use full synchronization instead of fast synchronization. The receiving device, (e.g., a PC) compares the DID received from the other device (e.g., a mobile phone) with a DID that it previously stored. If they are the same, then fast synchronization will be used. If they are different, then full synchronization is performed.

Unfortunately, although it may speed up the synchronization process, adding the change logs introduces another problem. More particularly, fast synchronization relies on the use of a time stamp associated with each entry in the change log 200, 210. The time stamp indicates what time a particular change was made. When a change log associated with one database (e.g., the change log 210 associated with the SIM 50) is supplied to the other device (e.g., the PC 10), the synchronization engine (not shown) within the other device uses the timestamp to resolve potential conflicts that can occur when one modification has been made to an entry in one of the databases and a different modification has been made to the same entry but in the other database. In such cases, the rule is to assume that the most recently made change is the correct one. For example, consider the situation in which there exists a record "A" in each of two devices (denoted "device 1" and "device 2") when databases in each of the devices have been synchronized with one another. Subsequent to synchronization, assume that on device 1 the record A is deleted at 12:34, while on device 2 the same record is modified at 12:40. The next time that the devices 1 and 2 are synchronized with one another, the synchronization procedure will detect that the same record has been deleted on one side and modified on the other. Taking the rule that the most recent modification is the correct one, the modification to record A that was performed on device 2 will be retained by copying it over to device 1. The two devices are now synchronized again.

It can be seen that, because the timestamps play such an important role in the synchronization process, that the timers in the devices need to be very accurate, aligned with one another, and unchanged. This is not always the case in mobile devices, however. It is quite common for the user of a mobile device to travel to another time zone and therefore, change the time on the device's clock. This can cause problems with synchronization, however, because if the user's timer is made to move forward or backward, it is possible for a recent change to a database to incorrectly appear to have taken place prior to the previous synchronization operation. As a result, that change would be ignored in the synchronization effort, effectively losing the change.

Figure 3:
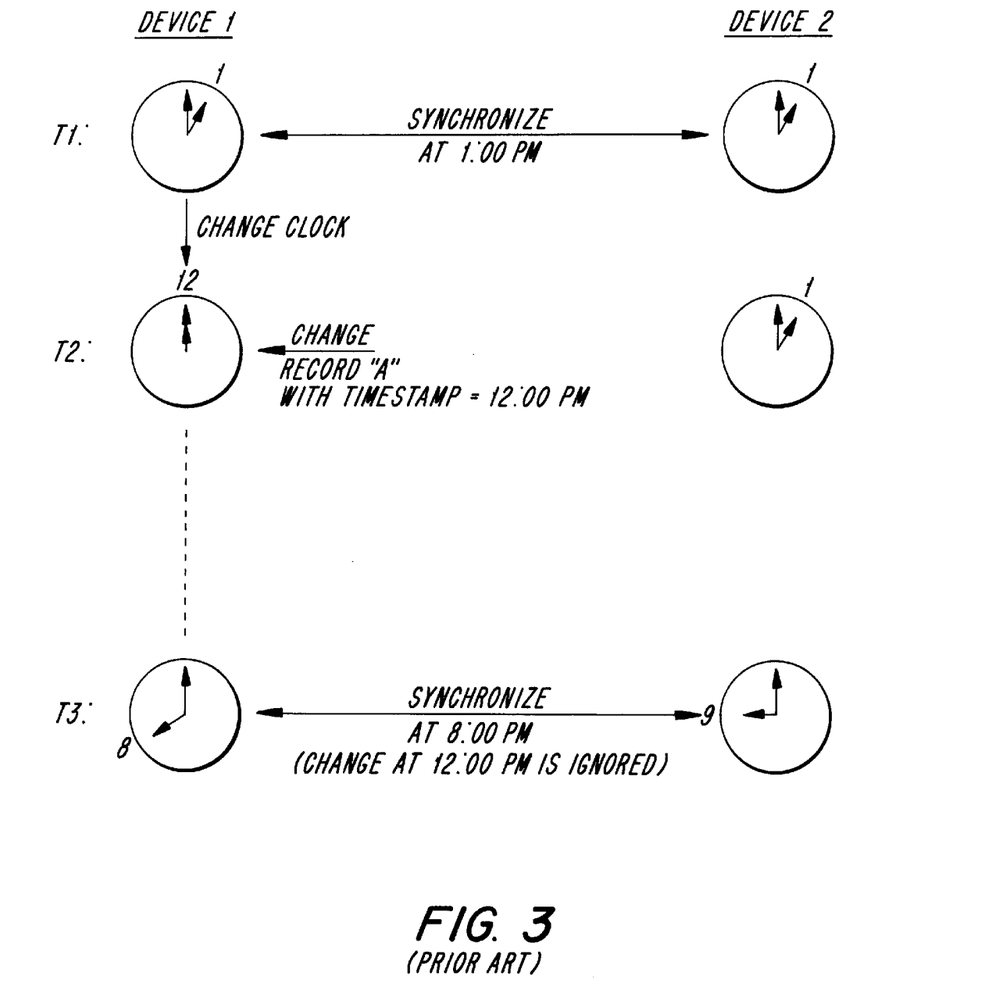
FIG. 3 illustrates a scenario in which changing the clock on a device can cause erroneous results to occur when a subsequent conventional database synchronization operation is performed.
Figure 4:
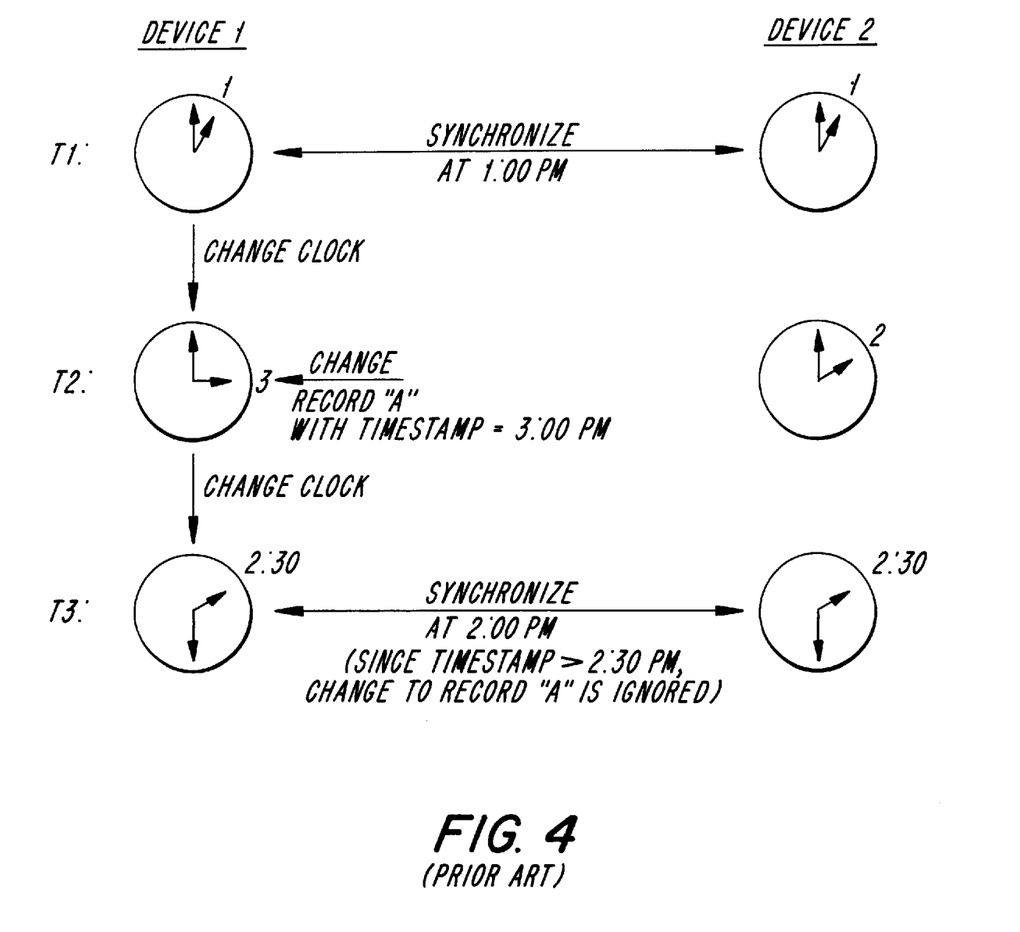
FIG. 4 illustrates a scenario in which changing the clock on a device can cause erroneous results to occur when a subsequent conventional database synchronization operation is performed.

FIGS. 3 and 4 illustrate some scenarios in which changing the clock on a device can cause erroneous results to occur when a subsequent database synchronization operation is performed. Referring first to FIG. 3, this timing diagram shows clocks and events in each of two devices, denoted "Device 1" and "Device 2". At time T1, the clocks in both devices read "1:00pm", at which time a fast database synchronization operation is performed. As mentioned earlier, this causes, among other things, the time of synchronization to be recorded in the change log 200. Sometime later, at a time denoted T2, the clock in Device 1 has been set back, so that it now reads 12:00pm (i.e., a time earlier than 1:00pm). This may have been done, for example, to account for travel through one or more time zones. At this time T2, a record "A" in Device 1's database is changed. This change is recorded in the change log 200, along with a timestamp= 12:00pm, indicating the time of the change. At a subsequently later time, denoted time T3, the clock in Device 1 indicates 8:00pm, and the clock in Device 2 indicates 9:00pm. At this time, T3, another fast database synchronization operation is performed between the respective databases in Device 1 and Device 2. As part of this synchronization operation, the synchronization engine looks at the timestamps in the change log 200, and ignores all changes that appear to have taken place prior to the previous synchronization operation (which took place at time T3). As a result, the change to record "A", which actually took place at time T2, appears to have occurred prior to time T1 (i.e., the time of the previous synchronization operation). Accordingly, the change to record "A" that was made at time T2 is ignored in the synchronization operation, effectively losing it. It will be observed that even if the clock in Device 1 had been moved ahead one hour at some point between time T2 and T3, so that at time T3 the clocks in Devices 1 and 2 both read 9:00pm, the change made to record "A" in Device 1 at time T2 will be lost in the synchronization operation.

FIG. 4 illustrates another scenario in which changing the clock on a device can cause erroneous results to occur when a subsequent database synchronization operation is performed. Here, this timing diagram shows clocks and events in each of two devices, denoted "Device 1" and "Device 2". At time T1, the clocks in both devices read "1:00pm", at which time a fast database synchronization operation is performed. As mentioned earlier, this causes, among other things, the time of synchronization to be recorded in the change log 200. The value of the clock in Device 1 is subsequently moved forward, so that at time T2, it reads 3:00pm while the clock in Device 2 only reads "2:00pm". At this time T2, a record "A" in the Device 1's database is changed. This change is recorded in the change log 200, along with a timestamp=3:00pm, indicating the time of the change. Subsequently, the clock in Device 1 is again changed, this time backward, so that at a time denoted T3, it and the clock in Device 2 both read 2:30pm. At this time T3, a fast synchronization operation is again performed between the databases in Device 1 and Device 2. However, because the timestamp associated with the change to record "A" at time T2 indicates that the change took place at 3:00pm (i.e., a time later than the present time of 2:30pm), the change to record "A" is ignored in the synchronization operation, effectively losing this data.

It is possible to construct still other examples in which a change to a clock causes a fast synchronization operation to effectively lose one or more changes to records in the database.

Accordingly, it would be desirable to provide techniques and apparatuses that enable the usage of change logs for synchronizing databases, but also accommodate the movement of portable devices across time zones.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods, apparatuses and computer readable storage media that synchronize a first database with a second database, wherein the first database is located in a mobile terminal. Synchronization comprises setting an indicator to indicate that a full synchronization should be performed in response to detecting that a timer in the mobile terminal has been set back. Then, a full synchronization of the first database with the second database is performed if the indicator is set.

The indicator may be data dedicated to that purpose. However in alternative embodiments, setting the indicator may instead comprise changing a value of a database identifier. Since the database identifier will be communicated between the two databases anyway, no additional information needs to be communicated merely for the purpose of indicating that a full synchronization should be performed.

If the indicator is not set, a fast synchronization of the first database with the second database may instead be performed.

Moreover, if it is desired to establish a default synchronization technique, the indicator may be reset after performing the full synchronization of the first database with the second database.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with respect to the figures, in which like parts are identified with the same reference characters.

The following description is written in terms of a cellular radiotelephone system, but it will be understood that the invention is not limited to that environment. More specifically, the following description is written using terms which may be associated with GSM compliant systems (e.g., terminals employing SIM cards), but it will be understood by those skilled in the art that the present invention may be implemented in other communication/information handling applications including those which are designed in accordance with other standards, such as IS-95 or PDC, as well as those which use other access methodologies, such as CDMA. Moreover, the following techniques are also applicable to synchronizing databases between any two information/communication devices.

The invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more programmable processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action.

As mentioned earlier, it is possible for a system to support both full and fast synchronization. In such systems, it is possible to select one for use as the default operation. For example, fast synchronization may be the type of synchronization that is performed in most instances. Invoking full synchronization of two databases when fast synchronization is available may then been accomplished by providing some type of indicator to the synchronizing entity, instructing that a full synchronization should be performed. Such an indicator may take the form of, for example, a random or incremental change in the value of the database identifier (DID) which is passed between the devices as part of the synchronization process.

Figure 5:
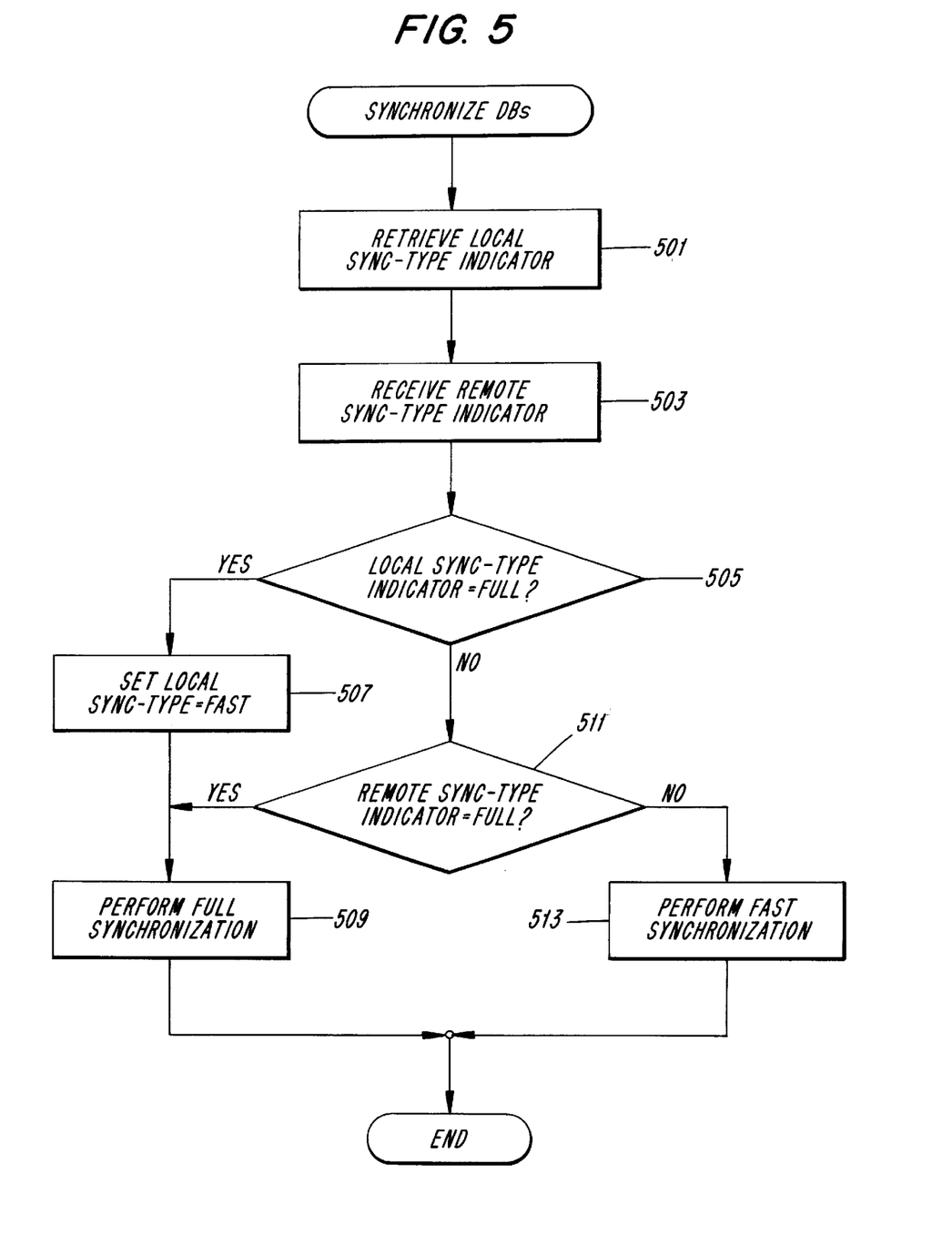
FIG. 5 is a flowchart that illustrates exemplary steps that may be performed by a synchronizing entity to select which type of synchronization to perform, in accordance with the invention.

FIG. 5 is a flowchart that illustrates exemplary steps that may be performed by a synchronizing entity to select which type of synchronization to perform. The synchronizing entity relies on two indicators: a locally generated indicator (LOCAL SYNC-TYPE), and one that is provided by the other device (REMOTE SYNC-TYPE). The reason why there are two indicators is because the device that initiates the synchronization process may not be the same device that has determined that a full, rather than a fast, synchronization operation is called for.

These indicators may be specially-allocated variables that are exclusively reserved for this purpose. However, this is not an essential aspect of the invention. For example, either or both of these indicators can take the form of a change in a database identifier (DID) value. Such embodiments have an advantage in that the DID value is usually one of the parameters that are exchanged between databases as part of the change log. Thus, the need to further exchange additional parameters (i.e., sync type indicators) can be eliminated. The particular strategy adopted in any particular system is not critical, and may be left up to the individual designer. For the sake of simplicity, the exemplary embodiment utilizes indicators that are dedicated to this purpose.

To begin the synchronization process, a LOCAL SYNC-TYPE indicator is retrieved, for example from a local memory device (step 501). (In embodiments in which a change in DID indicates the need to perform a full synchronization, retrieving the LOCAL SYNC-TYPE indicator may mean comparing a present DID with a DID that was saved at the time of the last synchronization operation.) The indicator provided by the other device (REMOTE SYNC-TYPE indicator) is received as well (step 503).

The values of the two indicators are then tested. For example, the LOCAL SYNC-TYPE indicator may be tested first (decision block 505). If it indicates that a full synchronization is required ("YES" path out of decision block 505), then the LOCAL SYNC-TYPE indicator is returned to its default value (i.e., set to indicate that a fast synchronization should be performed) (step 507) and a full synchronization is performed (step 509). Setting the LOCAL SYNC-TYPE indicator to its default value ensures that, unless express actions are taken to do otherwise, the default operation will be performed the next time a synchronization operation is invoked.

If the LOCAL SYNC-TYPE indicator does not call for a full synchronization ("NO" path out of decision block 505), the REMOTE SYNC-TYPE indicator is tested (decision block 511). If the REMOTE SYNC-TYPE indicator indicates that a full synchronization should be performed ("YES" path out of decision block 511), then a full synchronization operation is performed (step 509).

Alternatively, if the REMOTE SYNC-TYPE indicator does not indicate that a full synchronization should be performed ("NO" path out of decision block 511), then a fast synchronization is performed (step 513).

Turning now to the "time trip" problem that was described in the BACKGROUND section of this disclosure, in accordance with the invention this problem is addressed by causing a full, rather than fast, synchronization operation to be performed whenever that synchronization operation follows a time changing operation. More particularly, a full synchronization operation should be performed if it follows a change in which the device's timer is set to an earlier time. It is also permissive, but not required, for a full synchronization operation to be performed if it follows a change in which the device's timer is set to a later time. This will ensure that synchronization will not be dependent on timestamp values, but instead will be done by comparing records between the two databases, one-at-a-time.

Figure 6:
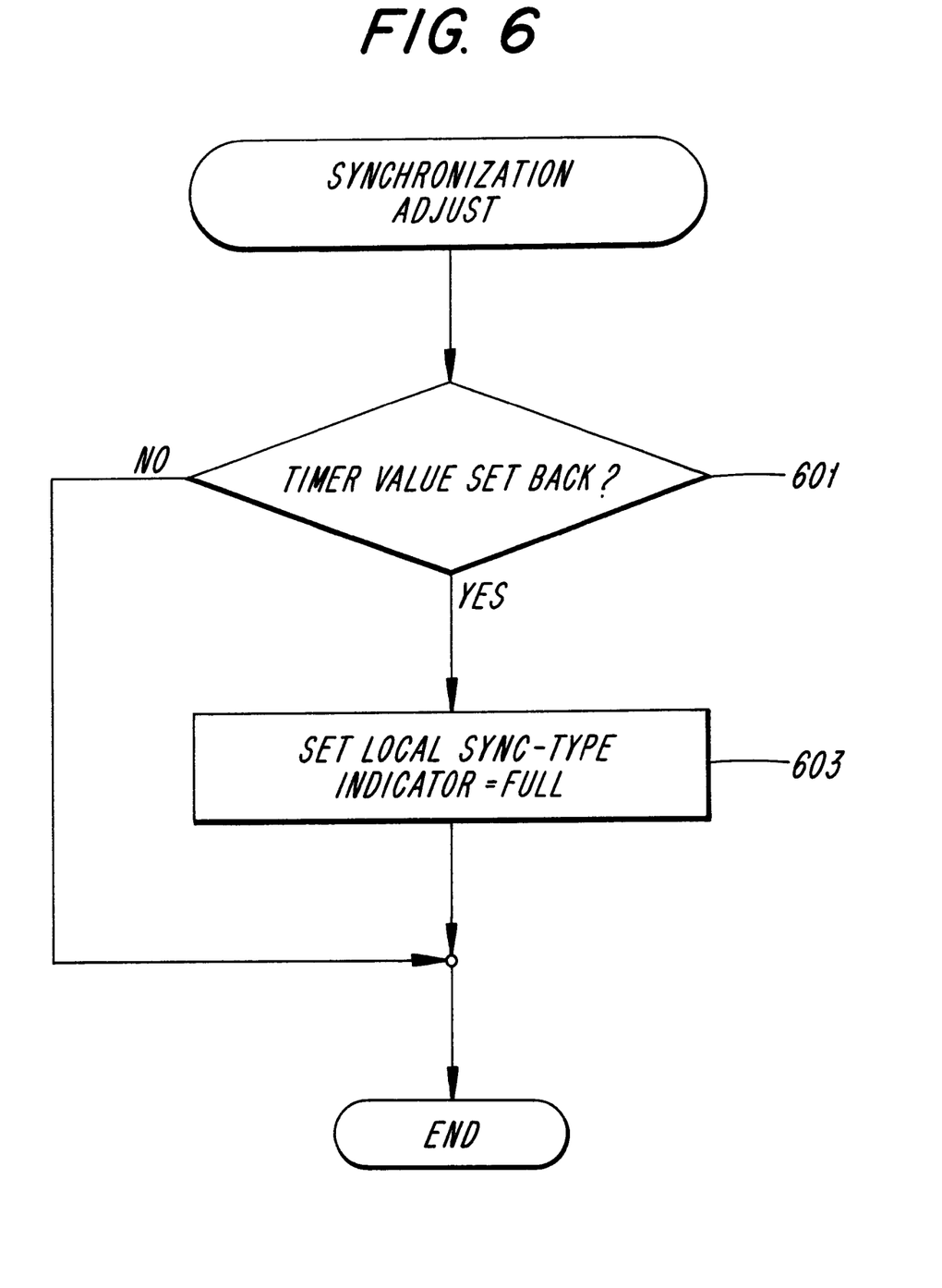
FIG. 6 is a flowchart depicting steps to be performed by a device to ensure that a full, rather than a fast, synchronization operation will be performed when necessary.

FIG. 6 is a flowchart depicting steps to be performed by a device to ensure that a full, rather than a fast, synchronization operation will be performed when necessary. First, a test is performed to determine whether the device's local timer value has been adjusted to an earlier value (decision block 601). If it has ("YES" path out of decision block 601), then the local sync-type indicator is set to indicate that a full synchronization operation should be performed (step 603). Otherwise, this step is skipped ("NO" path out of decision block 601). In some embodiments, the sync-type indicator may take the form of a changed DID value.

The invention solves the "time trip" problem, thereby making it possible to utilize timestamps for database synchronization. The solution may not be optimal, but it has the advantage of preventing the loss of data. Every time the user changes the time on the device (or at least, every time the user changes the time on the device to an earlier time), a full synchronization is performed, in which all data stored on the device is read, and compared to the other device's database. Differences are identified and updated on both devices. For those conflict situations in which a same record has been modified in the databases of both devices without any ability to accurately determine which modification is the most recent, a policy of always selecting the record from a particular one of the devices (e.g., always using the modification that was made on the PC) can be adopted.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of synchronizing a first database with a second database, wherein the first database is located in a mobile terminal, the method comprising:

setting an indicator to an indicator value in response to detecting that a timer in the mobile terminal has been set back; and selectively performing either a full synchronization or a fast synchronization of the first database with the second database according to the indicator value.

2. The method of claim 1, wherein setting the indicator comprises changing a value of a database identifier.

3. The method of claim 1, wherein a fast synchronization of the first database with the second database is performed if the indicator is not set and a full synchronization of the first database with the second database is performed if the indicator is set.

4. The method of claim 1, further comprising: resetting the indicator after performing the full synchronization of the first database with the second database.

5. An apparatus for synchronizing a first database with a second database, wherein the first database is located in a mobile terminal, the apparatus comprising:

logic that sets an indicator to an indicator value in response to detecting that a timer in the mobile terminal has been set back; and logic that selectively performs either a full synchronization or a fast synchronization of the first database with the second database according to the indicator value.

6. The apparatus of claim 5, wherein the logic that sets the indicator comprises logic that changes a value of a database identifier.

7. The apparatus of claim 5, wherein a fast synchronization of the first database with the second database is performed if the indicator is not set and a full synchronization of the first database with the second database is performed if the indicator is set.

8. The apparatus of claim 5, further comprising: logic that resets the indicator after performing the full synchronization of the first database with the second database.

9. A computer readable storage medium having stored therein program instructions that synchronize a first database with a second database, wherein the first database is located in a mobile terminal, the program instructions comprising:

program instructions that set an indicator to an indicator value in response to detecting that a timer in the mobile terminal has been set back; and program instructions that selectively perform either a full synchronization or a fast synchronization of the first database with the second database according to the indicator value.

10. The computer readable storage medium of claim 9, wherein the program instructions that set the indicator comprise computer instructions that change a value of a database identifier.

11. The computer readable storage medium of claim 9, wherein a fast synchronization of the first database with the second database is performed if the indicator is not set and a full synchronization of the first database with the second database is performed if the indicator is set.

12. The computer readable storage medium of claim 9, further comprising:

program instructions that reset the indicator after performing the full synchronization of the first database with the second database.

13. A method of synchronizing a first database with a second database, wherein the first database is located in a mobile terminal, the method comprising:

setting an indicator to an indicator value in response to detecting that a timer in the mobile terminal has been changed by a user of the mobile terminal; and selectively performing either a full synchronization or a fast synchronization of the first database with the second database according to the indicator value.

14. The method of claim 13, wherein setting the indicator comprises changing a value of a database identifier.

15. The method of claim 13, wherein a fast synchronization of the first database with the second database is performed if the indicator is not set and a full synchronization of the first database with the second database is Performed if the indicator is set.

16. The method of claim 13, further comprising:
resetting the indicator after performing the full synchronization of the first database with the second database.

17. An apparatus for synchronizing a first database with a second database, wherein the first database is located in a mobile terminal, the apparatus comprising:
logic that sets an indicator to an indicator value in response to detecting that a timer in the mobile terminal has been changed by a user of the mobile terminal; and
logic that selectively performs either a full synchronization or a fast synchronization of the first database with the second database according to the indicator value.

18. The apparatus of claim 17, wherein the logic that sets the indicator comprises logic that changes a value of a database identifier.

19. The apparatus of claim 17, wherein a fast synchronization of the first database with the second database is performed if the indicator is not set and a full synchronization of the first database with the second database is performed if the indicator is set.

20. The apparatus of claim 17, further comprising: logic that resets the indicator after performing the full synchronization of the first database with the second database.

21. A computer readable storage medium having stored therein program instructions that synchronize a first database with a second database, wherein the first database is located in a mobile terminal, the program instructions comprising:
program instructions that set an indicator to an indicator value in response to detecting that a timer in the mobile terminal has been changed by a user of the mobile terminal; and
program instructions that selectively perform either a full synchronization or a fast synchronization of the first database with the second database according to the indicator value.

22. The computer readable storage medium of claim 21, wherein the program instructions that set the indicator comprise computer instructions that change a value of a database identifier.

23. The computer readable storage medium of claim 21, a fast synchronization of the first database with the second database is performed if the indicator is not set and a full synchronization of the first database with the second database is performed if the indicator is set.

24. The computer readable storage medium of claim 21, further comprising:
program instructions that reset the indicator after performing the full synchronization of the first database with the second database.

* * * * *